(12) United States Patent
Wilson et al.

(10) Patent No.: US 8,458,445 B2
(45) Date of Patent: *Jun. 4, 2013

(54) COMPUTE UNITS USING LOCAL LUTS TO REDUCE PIPELINE STALLS

(75) Inventors: James Wilson, Foxboro, MA (US); Joshua A. Kablotsky, Carlisle, MA (US); Yosef Stein, Sharon, MA (US); Colm J. Prendergast, Cambridge, MA (US); Gregory M. Yukna, Norton, MA (US); Christopher M. Mayer, Dover, MA (US)

(73) Assignee: Analog Devices Inc., Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,644

(22) Filed: Aug. 10, 2011

(65) Prior Publication Data
US 2011/0296145 A1    Dec. 1, 2011

Related U.S. Application Data

(63) Continuation of application No. 11/258,801, filed on Oct. 26, 2005, now Pat. No. 8,024,551.

(51) Int. Cl.
*G06F 9/44* (2006.01)

(52) U.S. Cl.
USPC ........................................................ 712/225

(58) Field of Classification Search
None
See application file for complete search history.

(56) References Cited

U.S. PATENT DOCUMENTS

| | | | |
|---|---|---|---|
| 3,303,477 A | 2/1967 | Voigt | |
| 3,805,037 A | 4/1974 | Ellison | |
| 3,959,638 A | 5/1976 | Blum et al. | |
| 4,757,506 A | 7/1988 | Heichler | |
| 5,031,131 A | 7/1991 | Mikos | |
| 5,062,057 A | 10/1991 | Blacken et al. | |
| 5,101,338 A | 3/1992 | Fujiwara et al. | |
| 5,260,898 A | 11/1993 | Richardson | |
| 5,287,511 A | 2/1994 | Robinson et al. | |
| 5,351,047 A | 9/1994 | Behlen | |
| 5,386,523 A | 1/1995 | Crook et al. | |
| 5,530,825 A | 6/1996 | Black et al. | |
| 5,537,579 A | 7/1996 | Hiroyuki | |
| 5,666,116 A | 9/1997 | Bakhmutsky | |

(Continued)

FOREIGN PATENT DOCUMENTS

| JP | 04092921 | 3/1992 |
|---|---|---|
| JP | 06110852 | 4/1994 |

(Continued)

OTHER PUBLICATIONS

English translation of Office Action for Japanese Patent Application No. 2008537767, mailed Aug. 2, 2011, 7 pages.

(Continued)

*Primary Examiner* — Jacob A Petranek
(74) *Attorney, Agent, or Firm* — Bingham McCutchen LLP

(57) ABSTRACT

Reducing pipeline stall between a compute unit and address unit in a processor can be accomplished by computing results in a compute unit in response to instructions of an algorithm; storing in a local random access memory array in a compute unit predetermined sets of functions, related to the computed results for predetermined sets of instructions of the algorithm; and providing within the compute unit direct mapping of computed results to related function.

16 Claims, 13 Drawing Sheets

U.S. PATENT DOCUMENTS

| | | | |
|---|---|---|---|
| 5,675,332 | A | 10/1997 | Limberg |
| 5,689,452 | A | 11/1997 | Cameron |
| 5,696,941 | A | 12/1997 | Jung et al. |
| 5,710,939 | A | 1/1998 | Ballachino et al. |
| 5,790,827 | A * | 8/1998 | Leung .......................... 712/216 |
| 5,819,102 | A | 10/1998 | Reed et al. |
| 5,832,290 | A | 11/1998 | Gostin et al. |
| 5,937,438 | A | 8/1999 | Raghunath et al. |
| 5,961,640 | A | 10/1999 | Chambers et al. |
| 5,970,241 | A | 10/1999 | Deao et al. |
| 5,996,057 | A | 11/1999 | Scales, III et al. |
| 5,996,066 | A | 11/1999 | Yung |
| 6,009,499 | A | 12/1999 | Koppala |
| 6,029,242 | A | 2/2000 | Sidman |
| 6,061,749 | A | 5/2000 | Webb et al. |
| 6,067,609 | A | 5/2000 | Meeker et al. |
| 6,094,726 | A | 7/2000 | Gonion et al. |
| 6,134,676 | A | 10/2000 | VanHuben et al. |
| 6,138,208 | A | 10/2000 | Dhong et al. |
| 6,151,705 | A | 11/2000 | Santhanam |
| 6,223,320 | B1 | 4/2001 | Dubey et al. |
| 6,230,179 | B1 | 5/2001 | Dworkin et al. |
| 6,263,420 | B1 | 7/2001 | Tan et al. |
| 6,272,452 | B1 | 8/2001 | Wu et al. |
| 6,285,607 | B1 | 9/2001 | Sinclair |
| 6,332,188 | B1 | 12/2001 | Garde et al. |
| 6,430,672 | B1 | 8/2002 | Dhong et al. |
| 6,480,845 | B1 | 11/2002 | Egolf et al. |
| 6,539,477 | B1 | 3/2003 | Seawright |
| 6,587,864 | B2 | 7/2003 | Stein et al. |
| 6,757,806 | B2 | 6/2004 | Shim |
| 6,771,196 | B2 | 8/2004 | Hsiun |
| 6,829,694 | B2 | 12/2004 | Stein et al. |
| 7,173,985 | B1 | 2/2007 | Diaz-Manero et al. |
| 7,187,729 | B2 | 3/2007 | Nagano |
| 7,243,210 | B2 | 7/2007 | Pedersen et al. |
| 7,424,597 | B2 | 9/2008 | Lee et al. |
| 7,509,484 | B1 * | 3/2009 | Golla et al. .................... 712/225 |
| 7,728,744 | B2 | 6/2010 | Stein et al. |
| 7,882,284 | B2 | 2/2011 | Wilson et al. |
| 2003/0085822 | A1 | 5/2003 | Scheuermann |
| 2003/0103626 | A1 | 6/2003 | Stein et al. |
| 2003/0133568 | A1 | 7/2003 | Stein et al. |
| 2003/0149857 | A1 | 8/2003 | Stein et al. |
| 2003/0196072 | A1 | 10/2003 | Chinnakonda et al. |
| 2003/0229769 | A1 | 12/2003 | Montemayor |
| 2004/0145942 | A1 | 7/2004 | Leijten-Nowak |
| 2004/0193850 | A1 | 9/2004 | Lee et al. |
| 2004/0210618 | A1 | 10/2004 | Stein et al. |
| 2005/0086452 | A1 | 4/2005 | Ross |
| 2005/0149698 | A1* | 7/2005 | Yeh et al. ....................... 712/217 |
| 2005/0228966 | A1 | 10/2005 | Nakamura |
| 2005/0267996 | A1 | 12/2005 | O'Connor et al. |
| 2006/0107021 | A1* | 5/2006 | Barrick et al. ................ 711/204 |
| 2006/0143554 | A1 | 6/2006 | Sudhakar et al. |
| 2006/0271763 | A1 | 11/2006 | Pedersen et al. |
| 2007/0044008 | A1 | 2/2007 | Chen et al. |
| 2007/0089043 | A1 | 4/2007 | Chae et al. |
| 2007/0094474 | A1 | 4/2007 | Wilson et al. |
| 2007/0094483 | A1 | 4/2007 | Wilson et al. |
| 2007/0277021 | A1 | 11/2007 | OConnor et al. |
| 2008/0010439 | A1 | 1/2008 | Stein et al. |
| 2008/0244237 | A1 | 10/2008 | Wilson et al. |
| 2009/0089649 | A1 | 4/2009 | Wilson et al. |

FOREIGN PATENT DOCUMENTS

| | | |
|---|---|---|
| JP | 2001210357 | 8/2001 |
| JP | 02290494 | 10/2002 |
| JP | 05513541 | 5/2005 |
| WO | WO-96/10226 | 4/1996 |
| WO | WO-03/067364 | 8/2003 |

OTHER PUBLICATIONS

Goslin, "A guide to Using Field Programmable Gate Arrays for Application Specific Digital Signal Processing Performance," [online], Xilinx, Dec. 1995 [retrieved Aug. 19, 2009]. Retrieved from the Internet: <http://www.xilinx.com/appnotes/dspguide.pdf>, 11 pages.

Microsoft Computer Dictionary, 2002, Microsoft Press, 5th ed., p. 474.

Hendrix et al., "Viterbi Decoding Techniques for the TMS32054x DSP Generation," Texas Instruments, Application Report SPRA071A-Jan. 2002, pp. 1-8.

Intel, Pentium Processor Family Developer's Manual, [online], vol. 3, Architecture and Programming Manual, 1995, [retrieved Dec. 7, 2009]. Retrieved from the Internet: <http://download.intel.com/design/pentium/MANUALS/24143004.pdf>, retrieved Dec. 7, 2009, 1032 pages.

Rasheed et al., "Reconfigurable Viterbi Decoder for Mobile Platform," Mobile Communications Department, Institut Eurecom Sophia Antipolis, France, 3 pages, Sep. 2005.

Yadav et al., "Software-Only Multiple Variable Length Decoding for Real-Time Video on MDSP," International Conference on Consumer Electronics, 2005, ICCE, 2005 Digest of Technical Papers, Jan. 8-12, 2005, DOI: 0-7803-8838-0/05 2005, pp. 141-142.

International Search Report for International Application No. PCT/US2006/040510, mailed Oct. 17, 2007, 2 pages.

Written Opinion for International Application No. PCT/US2006/040510, mailed Oct. 17, 2007, 9 pages.

Supplementary European Search Report and Opinion for European Patent Application No. 06817042.2, mailed Nov. 17, 2008, 8 pages.

English translation of Office Action for Chinese Patent Application No. 200680039988.6, mailed Jun. 19, 2009, 7 pages.

International Search Report for International Application No. PCT/US2008/010524, mailed Nov. 28, 2008, 1 page.

Written Opinion for International Application No. PCT/US2008/010524, mailed Nov. 28, 2008, 7 pages.

International Search Report for International Application No. PCT/US2006/040414, mailed Oct. 1, 2007, 1 page.

Written Opinion for International Application No. PCT/US2006/040414, mailed Oct. 1, 2007, 7 pages.

English translation of Office Action for Taiwan Patent Application No. 095139557, mailed Sep. 29, 2009, 5 pages.

Supplementary European Search Report and Opinion for European Patent Application No. 06817002.6, mailed Mar. 17, 2009, 5 pages.

International Search Report for International Application No. PCT/US2008/002914, mailed Jun. 27, 2008, 1 page.

Written Opinion for International Application No. PCT/US2008/002914, mailed Jun. 27, 2008, 4 pages.

International Search Report for International Application No. PCT/US2008/010571, mailed Nov. 25, 2008, 2 pages.

Written Opinion for International Application No. PCT/US2008/010571, mailed Nov. 25, 2008, 4 pages.

English translation of Office Action for Chinese Patent Application No. 200680039988.6, mailed Dec. 4, 2009, 4 pages.

English translation of Office Action for Chinese Patent Application No. 200680047898.1, mailed Jan. 8, 2010, 5 pages.

Examination Report for European Patent Application No. 06817042.2, mailed May 26, 2010, 6 pages.

English translation of Office Action for Chinese Patent Application No. 200680039988.6, mailed Jun. 10, 2010, 6 pages.

English translation of Office Action for Japanese Patent Application No. 2008537761, mailed Mar. 8, 2011, 5 pages.

Examination Report for European Patent Application No. 06817002.6 mailed Sep. 16, 2009, 5 pages.

Examination Report for European Patent Application No. 06817042.2 mailed May 26, 2010, 6 pages.

English translation of Office Action for Taiwan Patent Application No. 095139563, mailed Jul. 14, 2010, 7 pages.

Hennessy et al. "Computer Organization and Design: The Hardware/Software Interface" Morgan Kaufmann Publishers, Inc., 2nd ed., 1997, pp. 449-465.

Citron et al. "Accelerating Multi-Media Processing by Implementing Memoing in Multiplication and Division Units," ACM Sigplan Notices, ACM, Association for Computer Machinery, NY, NY, vol. 33, No. 11, Nov. 1998, pp. 252-261.

Richardson, "Exploiting Trivial and Redundant Computation," Computer Arithmetic, 1993, Proceedings, 11th Symposium on Windsor, Ont. Canada, Jun. 29-Jul. 2, 1983, Los Alamitos, CA, USA, IEEE Comput. Soc., Jun. 1993, pp. 220-227.

\* cited by examiner

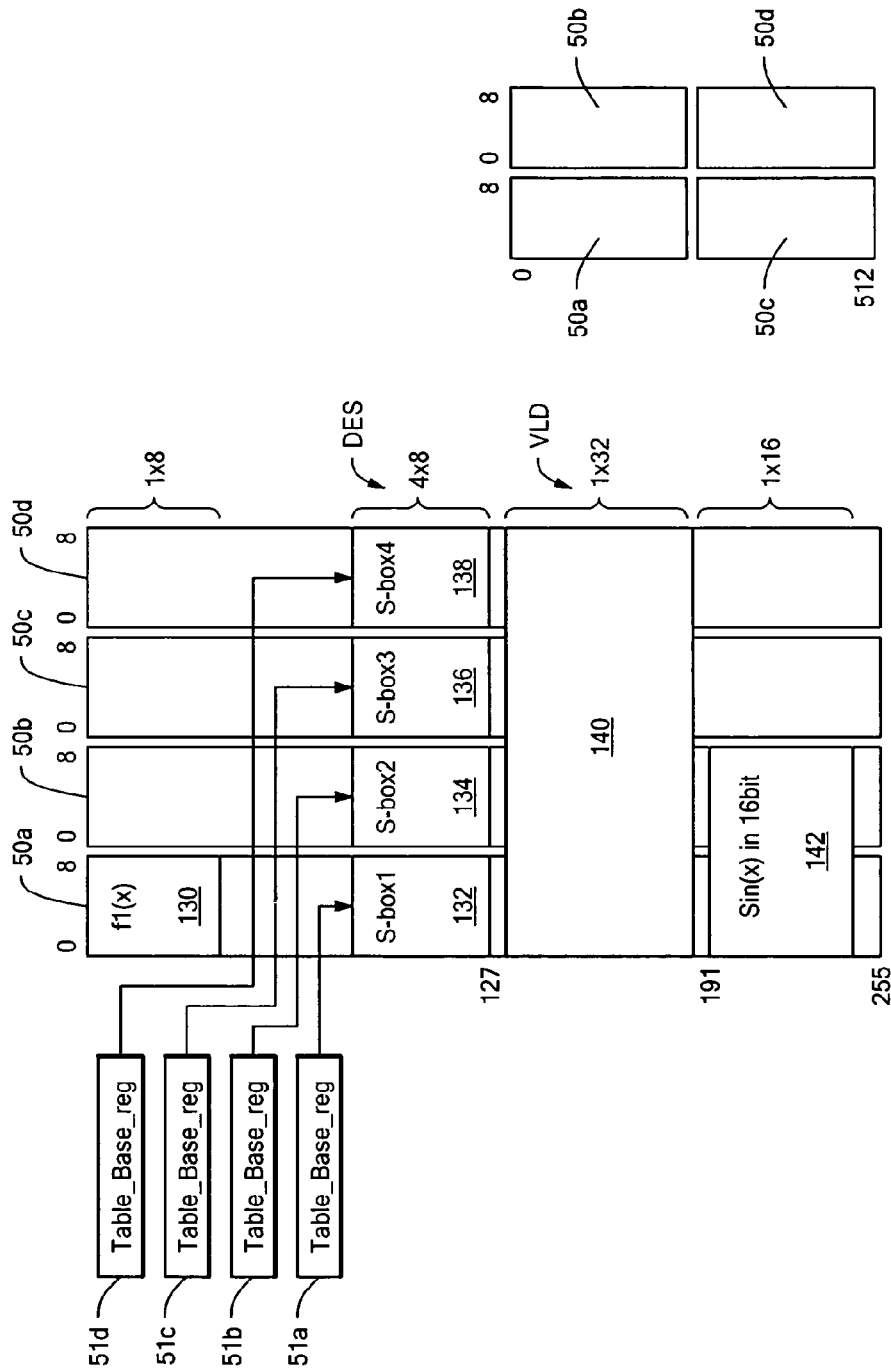

|  |  |  | MPEG-2 Max Symbol Size 16 bit |  |  |  |
|---|---|---|---|---|---|---|
|  |  | 8 5 3 |  |  | 8 4 4 |  |
| 1 | 25 | 0.972656 |  | 25 | 0.972656 |  |
| 2 | 40 | 0.013672 |  | 24 | 0.011719 |  |
| 3 | 48 | 0.001709 |  | 64 | 0.003662 |  |
| 4 |  |  |  |  |  |  |
|  |  |  |  |  |  |  |
|  |  |  |  |  |  |  |
| Average Memory access |  | 1.005127 |  |  | 1.00708 |  |
|  |  |  |  |  |  |  |

COMPUTE UNITS USING LOCAL LUTS TO REDUCE PIPELINE STALLS

RELATED APPLICATIONS

This application is a continuation of and claims the benefit of U.S. patent application Serial No. 11/258,801, filed Oct. 26, 2005, the entire disclosure of which is hereby incorporated by reference.

FIELD OF THE INVENTION

This invention relates to a pipelined digital signal processor for avoiding pipeline stall between compute unit and address unit.

BACKGROUND OF THE INVENTION

As computer speed increased from 33 mHz to 1.2 GHz and beyond, the computer operations could not be completed in one cycle. As a result the technique of pipelining was adopted to make most efficient use of the higher processor performance and to improve their throughput. Presently deep pipelining uses as many as 25 stages or more. Generally, in a pipelined computing system there are several parallel building blocks working simultaneously where each block takes care of different parts of the whole process for example, there is a compute unit that does the computation, an address unit including a data address generator (DAG) that fetches and stores the data in memory according to the selected address modes and a sequencer or control circuit that decodes and distributes the instructions. The DAG is the only component that can address the memory. Thus in a deeply pipelined system if an instruction is dependent on the result of another one, a pipeline stall will happen where the pipeline will stop, waiting for the offending instruction to finish before resuming work. For example, if, after a computation, the output of the computing unit is needed by the DAG for the next data fetch, it can't be delivered directly to the DAG to be conditioned for a data fetch: it must propagate through the pipeline before it can be processed by the DAG to do the next data fetch and computation. This is so because only the DAG has access to the memory and can convert the compute result to an address pointer to locate the desired data. In multi-tasking general purpose computers this stall may not be critical but in real time computer systems such as used in e.g., cell phones, digital cameras, these stalls are a problem.

SUMMARY OF THE INVENTION

It is therefore an object of this invention to provide an improved pipelined digital signal processor for minimizing pipeline stall between compute unit and address unit.

It is a further object of this invention to provide such an improved pipelined digital signal processor for minimizing pipeline stall between compute unit and address unit which employs a local reconfigurable fill and spill random access memory array.

It is a further object of this invention to provide such an improved pipelined digital signal processor for minimizing pipeline stall between compute unit and address unit having increased performance efficiency.

It is a further object of this invention to provide such an improved pipelined digital signal processor for minimizing pipeline stall between compute unit and address unit which can be parallel as well as serially filled and spilled.

It is a further object of this invention to provide such an improved pipelined digital signal processor for minimizing pipeline stall between compute unit and address unit which local reconfigurable fill and spill random access memory array is selectively, conditionally spilled when the one or more of the stored values in a set of functions has been updated.

It is a further object of this invention to provide such an improved pipelined digital signal processor for minimizing pipeline stall between compute unit and address unit which employs shared input and output registers among a plurality of local reconfigurable fill and spill random access memory arrays for mapping results to functions on a one to one basis in each local reconfigurable fill and spill random access memory array or for mapping result inputs to one composite output function constituted by the function parts presented by each of the single local reconfigurable fill and spill random access memory arrays.

It is a further object of this invention to provide such an improved pipelined digital signal processor for minimizing pipeline stall between compute unit and address unit in which the local reconfigurable fill and spill random access memory array is small enough to fit in a conventional compute unit and to be accessible in one cycle yet large enough to support most applications internally of the compute unit.

It is a further object of this invention to provide such an improved pipelined digital signal processor for minimizing pipeline stall between compute unit and address unit which avoids the penalty of pipeline stall by directly mapping the compute unit result to the associated function stored in a local reconfigurable fill and spill random access memory array.

The invention results from the realization that a new improved pipelined digital signal processor for minimizing pipeline stall between compute unit and address unit can be achieved with one or more compute units which compute results in response to instructions from an algorithm and including with each compute unit a local reconfigurable fill and spill random access memory array which stores predetermined sets of functions related to the computed results for predetermined sets of instructions of the algorithm to provide direct mapping of computed results to related functions within the compute unit.

The subject invention, however, in other embodiments, need not achieve all these objectives and the claims hereof should not be limited to structures or methods capable of achieving these objectives.

This invention features a processor containing apparatus for reducing pipeline stall between compute unit and address unit including: at least one compute unit for computing results in response to instructions of an algorithm. Each compute unit includes a local random access memory array for storing predetermined sets of function values, related to the computed results for predetermined sets of instructions of the algorithm, to provide within the compute unit direct mapping of computed results to related function.

In a preferred embodiment there may be a register file shared by the compute units. All the compute unit local random access memory arrays may be filled in parallel with like values from the register file. Local random access memory arrays may be filled with different values in parallel from the register file. The local random access memory arrays may be spilled in parallel to the register file. The compute circuit may include a status device indicating when one or more function values stored in a section of the random access memory array have been updated. The status device may be used to decide whether function values in the random access memory array should be spilled and saved. The mapping of the computed result to related function may be independent from the previous computed result mapping. The mapping of the computed result to the related function may be independent from one compute unit to another. The register from the register file may be used as an index to the random access memory arrays in multiple compute units. The output of the random access memory arrays in multiple compute units may be combined into a single register in the register file. A different register from the register file may be used as an index to the random access memory array in each compute unit. The output of each random access memory array in each compute unit may be placed in different registers in the register file. The local random access memory array may include a look up table. There may be a control unit for storing in the local random access memory array predetermined sets of function values to provide direct mapping of computed results to related function within the compute unit. The compute unit may include a table base register associated with each local random access memory array for enabling related sets of data to be stored at independent addresses in each local reconfigurable fill and spill random access memory array.

This invention also features pipelined digital signal processor for: reducing pipeline stall between compute unit and address unit. There is at least one compute unit for computing results in response to instructions of an algorithm. Each compute unit includes a local reconfigurable fill and spill random access memory array for storing predetermined sets of functions, related to the computed results for predetermined sets of instructions of the algorithm, to provide within the compute unit direct mapping of computed result to related function.

In a preferred embodiment there may be a register file shared by the compute units. The register file may include an input register for filling like values in parallel across all the compute unit local reconfigurable fill and spill random access memory arrays. The register file may include an input register for filling different values serially in each of the compute unit local reconfigurable fill and spill random access memory arrays. The register file may include an output register for spilling stored values in parallel from the local reconfigurable fill and spill random access memory arrays. The register file may include an output register for spilling stored values serially from local reconfigurable fill and spill random access memory arrays. The compute unit may include a status device for enabling spilling of values from at least a section of the local reconfigurable fill and spill random access memory array when one or more of the values stored in the section have been updated. The mapping of the computed result to related function may be independent from the previous computed result mapping. The register file may include an input register shared by the local reconfigurable fill and spill random access memory arrays and an output register shared by the local reconfigurable fill and spill random access memory arrays. The input register may receive a different computed result for each local reconfigurable fill and spill random access memory array and the output register may present a different function from each local reconfigurable fill and spill random access memory array. The input register may receive the same computed result for each local reconfigurable fill and spill random access memory array and the output register file may present a single function constituted by the function parts presented by each of the local reconfigurable fill and spill random access memory array. The local reconfigurable fill and spill random access memory array may include a lookup table. There may be a control unit for storing in the local reconfigurable fill and spill random access memory array predetermined sets of functions, related to the computed results for predetermined sets of instructions in the algorithm, to provide direct mapping in computed result to related function within the compute unit.

The invention also features a method for reducing pipeline stall between a compute unit and address unit in a processor including computing results in a compute unit in response to instructions of an algorithm. Storing in a local random access memory array in a compute unit predetermined sets of functions, related to the computed results for predetermined sets of instructions of the algorithm and providing within the compute unit direct mapping of computed results to related function.

In a preferred embodiment the processor may include a register file shared by the compute units. The method may include filling all the compute unit local random access memory arrays in parallel with like values from the register file. The method may include filling local random access memory arrays with different values in parallel from the register file. The method may include spilling the local random access memory arrays in parallel to the register file. The method may further include indicating in a status device in the compute circuit when one or more values stored in a section of the random access memory array have been updated. The method may further include deciding in the status device whether values in the random access memory array should be spilled and saved. The method may further include mapping the computed result to related function independently from the previous computed result mapping. The method may further include mapping the computed result to the related function independently from one compute unit to another. A register from the register file may be used as an index to the random access memory arrays in multiple compute units. The method may further include combining the output of the random access memory arrays in multiple compute units into a single register in the register file. The method may further include using a different register from the register file as an index to the random access memory array in each compute unit. The method may further include placing the output of each random access memory array in each compute unit in different registers in the register file. The local random access memory array may include a look up table. The method may further include storing in the local random access memory array predetermined sets of instructions of the algorithm, to provide direct mapping of computed results to related function within the compute unit. Related sets of data may be stored at independent addresses in each local reconfigurable fill and spill random access memory array using a table base register associated with each local random access memory array in the compute unit.

BRIEF DESCRIPTION OF THE DRAWINGS

Other objects, features and advantages will occur to those skilled in the art from the following description of a preferred embodiment and the accompanying drawings, in which:

FIG. 8A illustrates a few of the many arrays into which the data structures of four local reconfigurable fill and spill random access memory arrays could be arranged according to this invention;

FIG. 8B illustrates another way of arranging the four local reconfigurable fill and spill random access memory arrays to obtain 512 16 bit values.

DISCLOSURE OF THE PREFERRED EMBODIMENT

Figure 1:
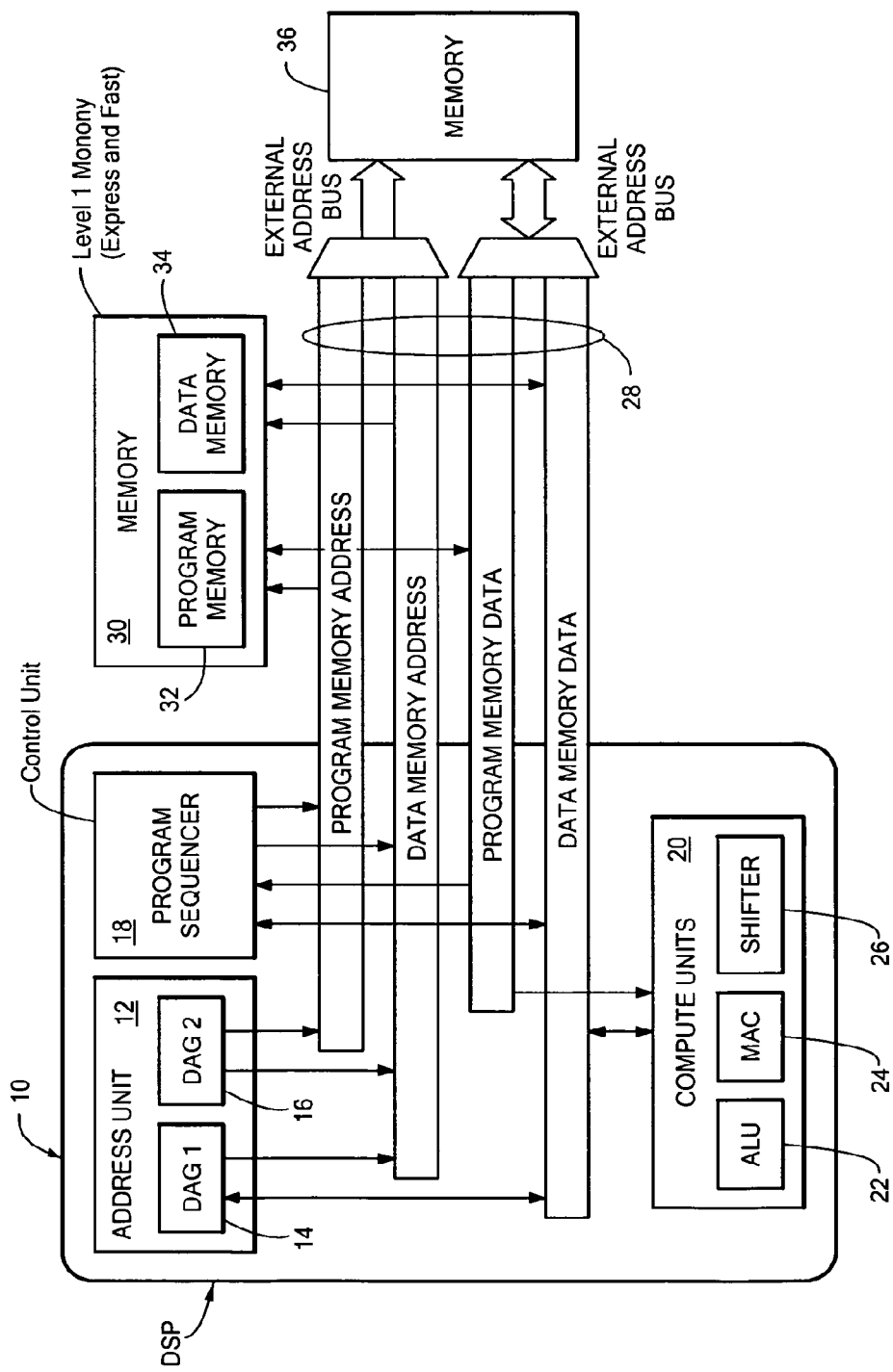
FIG. 1 is a simplified block diagram of a prior art digital signal processor (DSP) with external memories and memory buses.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a digital signal processor 10 including an address unit 12 having one or more digital address generators 14, 16. A control unit, such as program sequencer 18 and one or more compute units 20, each of which contains a number of circuits such as arithmetic logic unit 22, multiply/accumulator 24, shifter 26. Typically there are two, four or many more compute units in a digital signal processor. The digital signal processor is connected over memory buses 28 to one or more memories such as level one (L1) memory 30, including program memory 32 and data memory 34 or additional memory 36. Memory 30 may be a level one memory which is typically very fast and quite expensive. Memory 36 may be a level three (L3) memory which is less expensive and slower. With DSP 10 operating at 1 GHz and beyond, the cycles of operations are so fast that the address unit and the compute units require more than one cycle to complete their operations. To improve DSP 10 throughput and enhance its performance, it is typically deeply pipelined.

In pipelined operations, when there is no dependency between the result of a previous instruction and the subsequent one across all processor parallel building blocks the pipeline efficiencies are preserved. However, if there is such a dependency a pipeline stall happen, where the pipeline will stop and wait for the offending instruction to finish before resuming to work. For example, if a computed result cannot be directly stored but must be used to generate an address where the related function of that computed result can be found in memory, there is a dependency between the compute unit result and the DAG which breaks the smooth operation of the pipeline, an example will suffice to illustrate.

Figure 2:
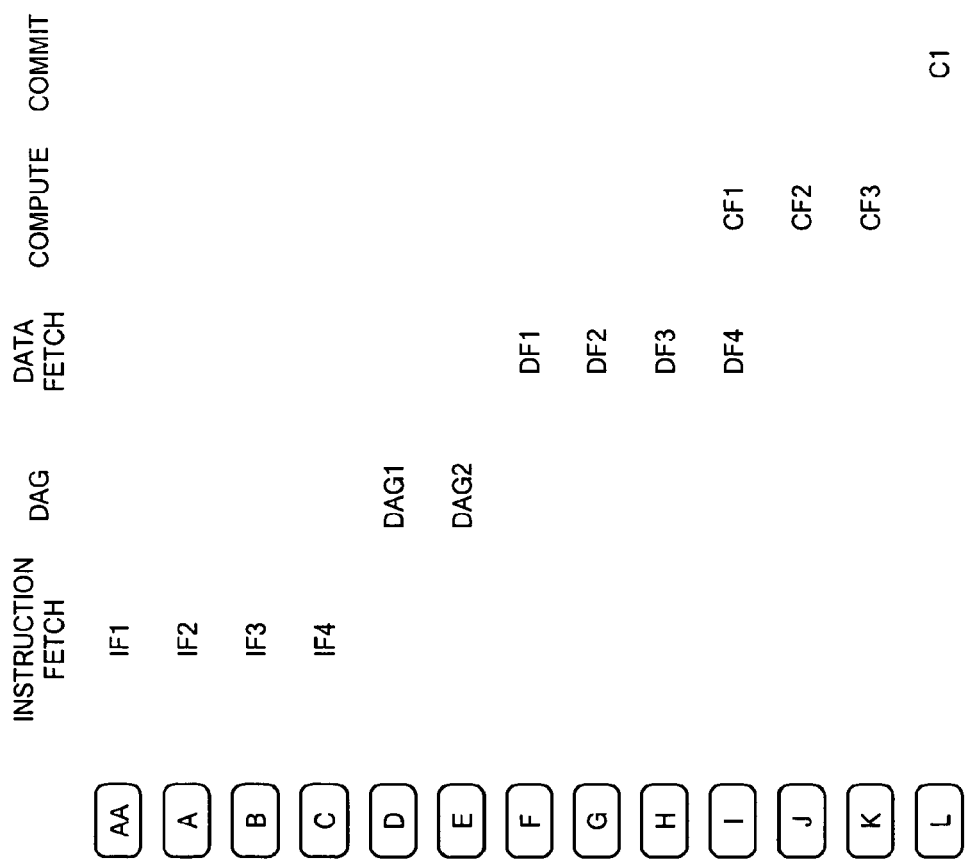
FIG. 2 is a schematic chart showing the multicycle steps required to perform instruction fetch, data address generation, data fetch, compute and commit operations in a DSP.

Suppose a compute unit computes a result which is an angle $\alpha$, but it is a function of that angle, sine $\alpha$, that is to be used in the execution of the subsequent operation. Then the compute unit must deliver the computed result to address unit 12 where DAG 14 or 16 generates the proper address to fetch from memory 30 or 36 the assigned function of that angle and bring it back and submit it to the compute unit. This stall or break in the pipeline wastes time. One feature of DSP 10 is that address unit 12 and only address unit 12 can address memories 30 and 36. Thus any time a compute unit needs information from L1 memory 30 or L3 memory 36 to operate, the pipelining operations become stalled due to the fact that the compute unit result is valid at a stage later than when the DAG 12 register is loaded This can be better understood with respect to the chart in FIG. 2 where it can be seen, for example, that the instruction fetch takes four machine cycles, IF1, IF2, IF3, IF4. The digital address generation requires two machines cycles DAG1, DAG2 and the data fetch four more machine cycles, DF1, DF2, DF3, DF4. The compute operation requires three cycles CF1, CF2, CF3 to obtain the computed result C1. Thus if a compute unit result from stage C1 is needed by the DAG of the next instruction it must "swim up" the pipeline and wait for stage D to be executed before the DAG register is loaded. This is a graphic example of pipeline stall.

Figure 3:
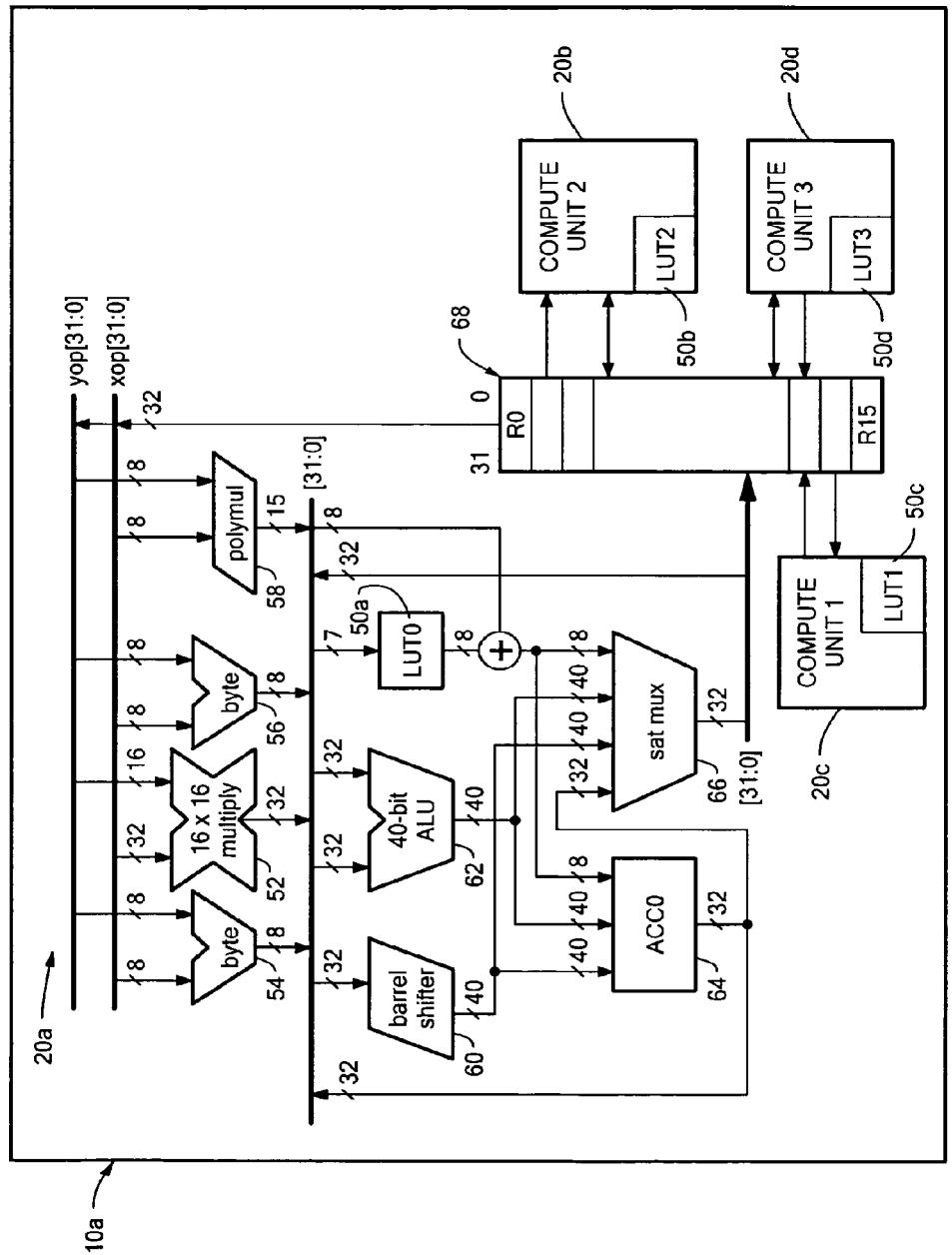
FIG. 3 is a schematic diagram of four compute units including local reconfigurable fill and spill random access memory arrays embodied as look up tables (LUTs) according to this invention with one shown in some detail.

In accordance with this invention in DSP 10a according to this invention, each compute unit 20a, 20b, 20c, 20d, FIG. 3, is provided with a local reconfigurable fill and spill random access memory array, for example, lookup table (LUT) 50a. Compute unit 28 typically may include multiplier 52, a number of select circuits 54 and 56, a polynomial multiplier 58, such as for Galois field operations, barrel shifter 60, arithmetic logic unit 62, accumulator 64, and mux 66 among other things. Also, each compute unit includes a register file 68. Typically when there is more than one compute unit, for example, as in FIG. 3, compute units 20a, 20b, 20c and 20d, they may all share the same register file 68. Each compute unit also has its own local reconfigurable fill and spill random access memory array, LUT 50a, 50b, 50c, and 50d. These local reconfigurable fill and spill random access memory arrays are small enough to fit in conventional compute units and to be accessible in one cycle, yet they are large enough to support most applications internally of the compute unit without having to go to external memory and bringing about pipeline stall.

Figure 4:
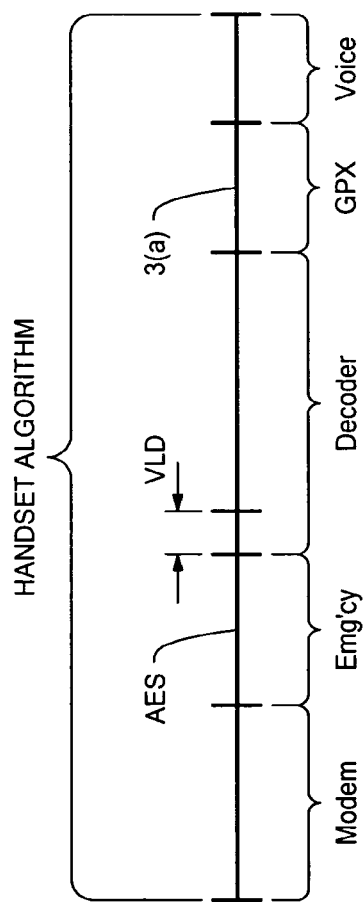
FIG. 4 is an illustration of a general algorithm and its constituent applications each including one or more specific algorithms executable by this invention.

DSP 10a may be used to implement a handset, in such a case the overall general handset algorithm, FIG. 4, may include a number of applications, each of which may include one or more specific algorithms. For example, the handset algorithm shown in FIG. 4, may include a modem application followed by an encryption application which may include for example an Advanced Encryption Standard (AES) followed by for example a video compression device such as MPEG2, MPEG4 or WMV which may use variable length decoding (VLD). There may also be a graphics application and a voice application.

Figure 5:
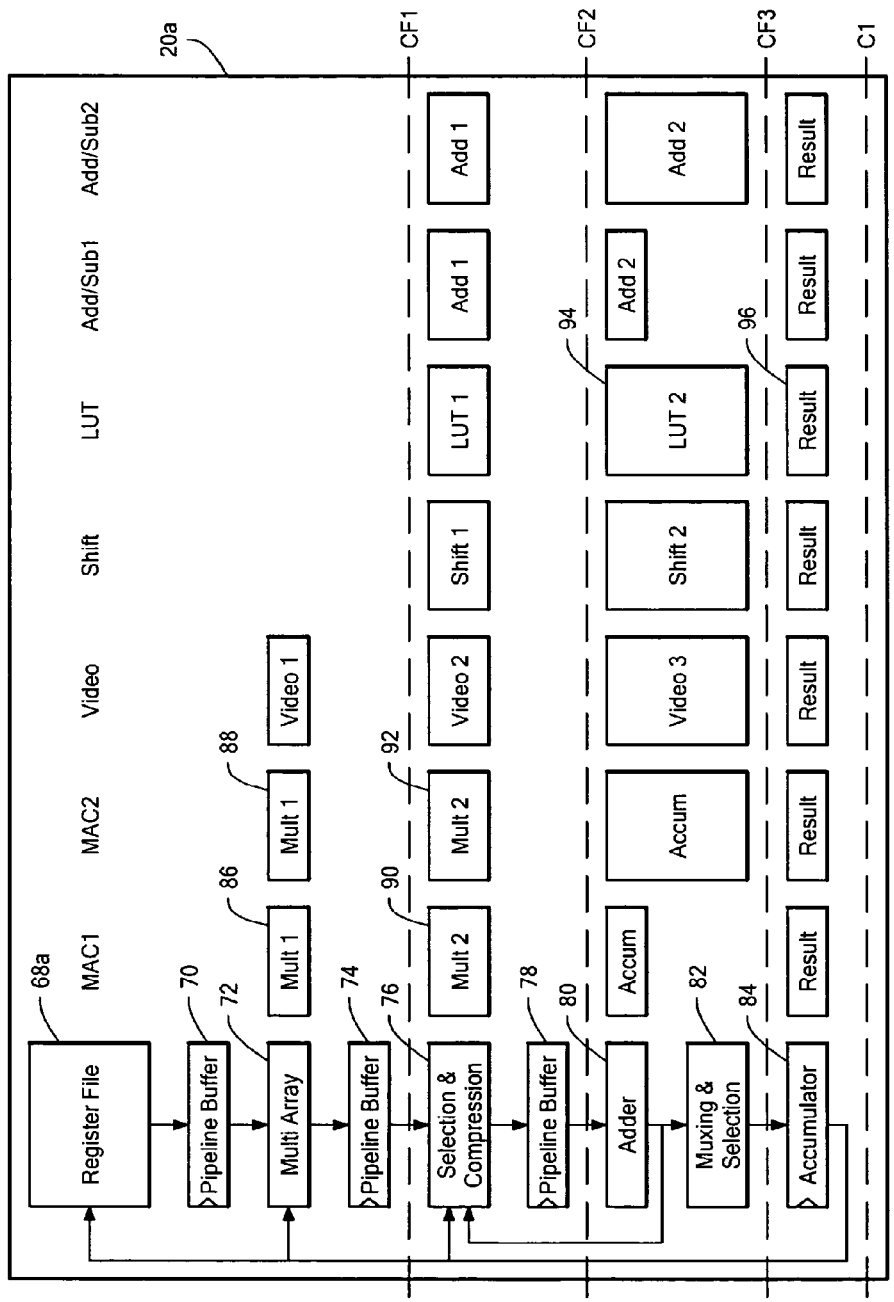
FIG. 5 is a schematic diagram of a compute unit according to this invention which minimizes pipeline stall by direct mapping within the compute unit of computed result to selected function.

The efficacy of this invention in carrying out such a general algorithm as shown in FIG. 4, is depicted in FIG. 5 in schematic form. There it can be seen that a value in the register file 68a moves through stage 70, multiply array 72, another pipeline stage 74, selection and compression circuit 76, yet another pipeline stage 78, an adder 80, muxing and selection circuit 82 and finally to accumulator 84 from which it can be loaded back into register file 68a. If the form of the output of accumulator 84 stored in register file 68a is proper for execution of subsequent instructions the compute unit does not require access to external memory. But suppose that the multiplication occurs using multipliers 86 and 88 at CF1 and multiplier 90 and 92 at CF2 and suppose further that the output of multipliers 90 and 92 needs to be mapped using a LUT for the subsequent instruction execution. Then an external fetch would have to be carried out which would cause pipeline stall due to the fact that the compute unit result is valid at a stage later than when the data address generator register is loaded. However, in accordance with this invention the output of multipliers 90 and 92 can be directed within the compute unit to LUT 94 during cycle CF3 where the stored functions are related to the computed results out of multipliers 90 and 92. This allows the result 96 to appear in accumulator 84 in a proper form so that when resident in register file 68a it is suitable for execution in the subsequent instruction, thus saving all of the extra cycle times required for an external fetch and avoiding pipeline stall.

Figure 6:
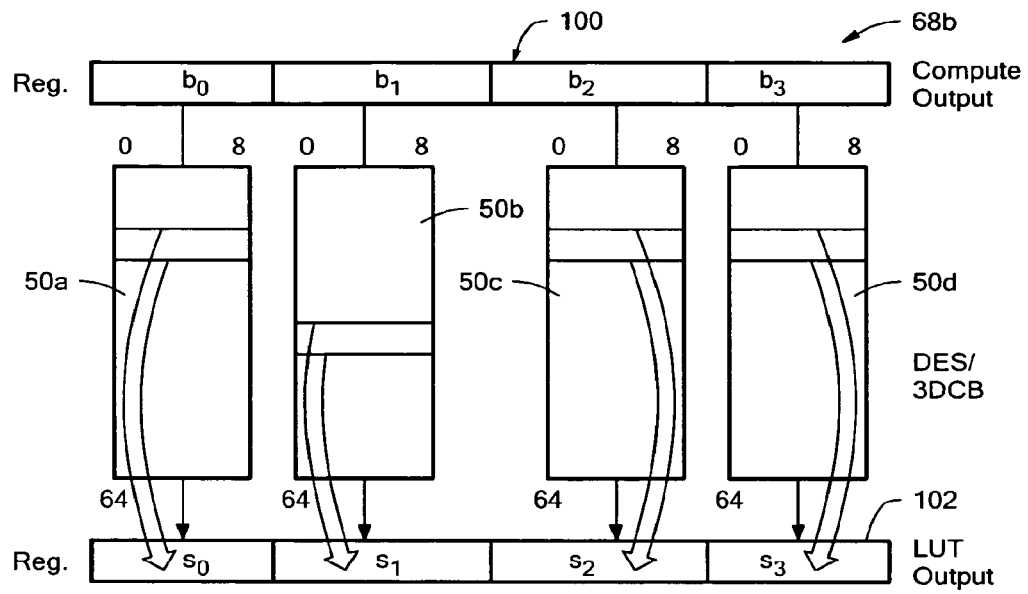
FIG. 6 is a schematic diagram of four local reconfigurable fill and spill random access memory arrays with shared register files implementing a Data Encryption Standard (Des/3Des) encryption.

The flexibility of the invention can be see in FIG. 6, where register file 68b including input register 100 and output register 102 are shared by a number, in this case, four local reconfigurable fill and spill random access memory arrays 50a, 50b, 50c, and 50d, each of which includes at least 64 eight bit values. Such an arrangement in a DES encryption application can receive four different 6-bit computed values $b_0$, $b_1$, $b_2$, b3 and provide four different values Sbox0, Sbox1, Sbox2 and Sbox3 at output register 102.

Figure 7:
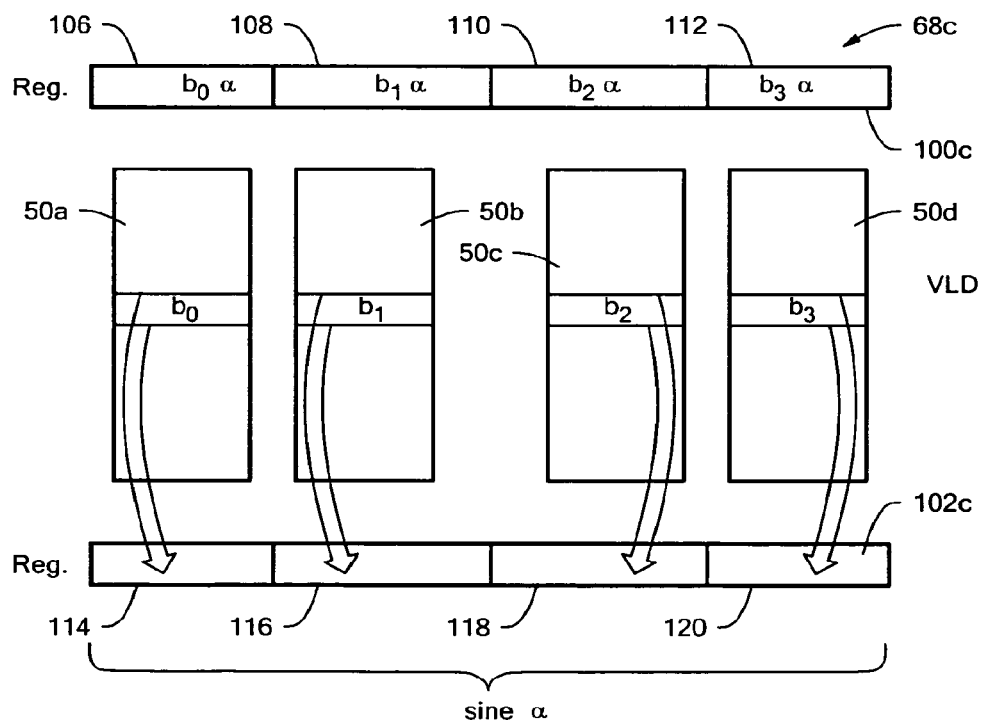
FIG. 7 is a schematic diagram of four local reconfigurable fill and spill random access memory arrays with shared register files implementing variable length decoding (VLD)
Figure 10:
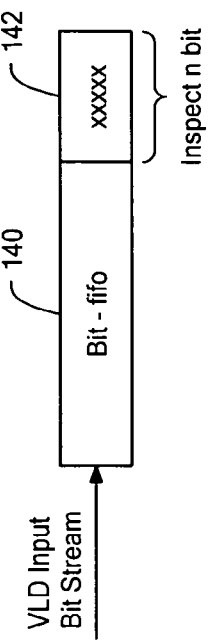
FIG. 10 is a diagram of a bit FIFO register for inspection of n bits of a VLD input stream.
Figure 9:
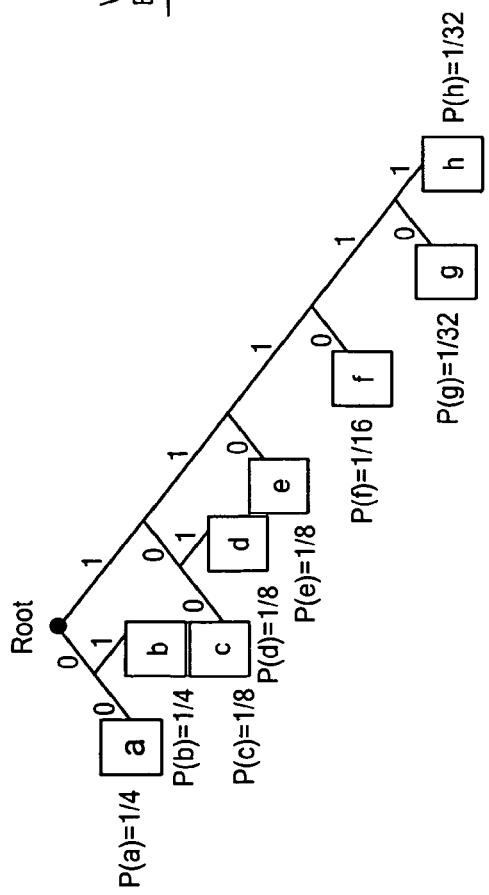
FIG. 9 is a chart illustrating VLD values for symbols a, b, c . . .
Figure 11:
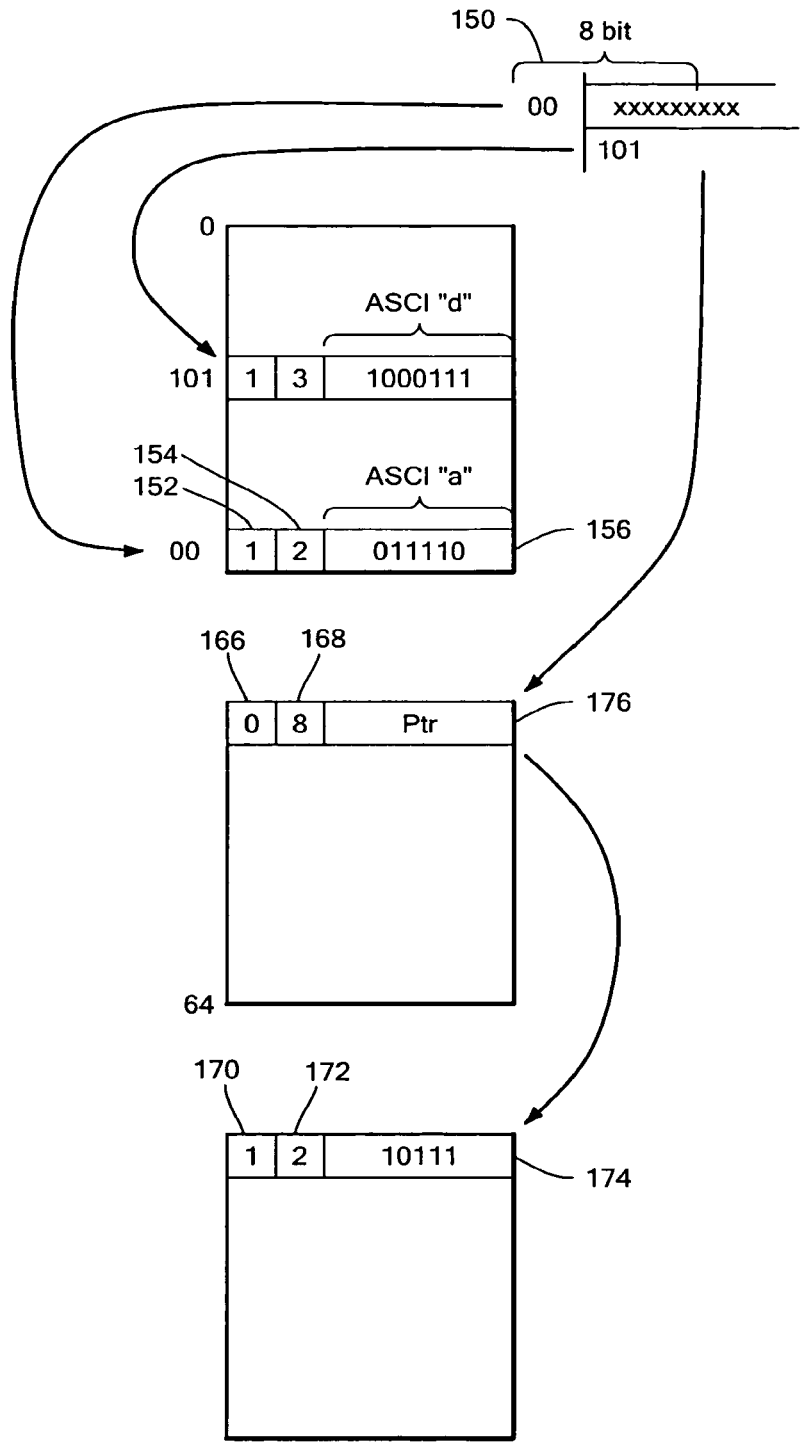
FIG. 11 is a diagram illustrating a few steps in a VLD decoding operation.

Alternatively, in communication type of applications, FIG. 7, the same computed result $b_0$ α may be placed in each portion 106, 108, 110, 112 of input register 100c so that they identify four parts of one value. For example, four parts of the sine of α. Each part being in a part 114, 116, 118, 120 of output register 102c and being 8 bits so that when combined they produced a 32 bit accuracy value for this sine α. Each local reconfigurable fill and spill random access memory array 50a, 50b, 50c, 50d may contain 256 8 bit values and may have their data structure arranged in a number of different ways. For example, FIG. 8A, local reconfigurable fill and spill random access memory array 50a may provide 8, 8 bit values 130 or each may provide different s-box values for an DES encryption as at 132, 134, 136, 138. The data may be structured across all of the local reconfigurable fill and spill random access memory arrays as at 140 providing 32 bit values such as for VLD decoding. Or just two of the local reconfigurable fill and spill random access memory arrays 50a, 50b may be employed 142 to access the sine value at 16 bit accuracy. As can be seen the data structure is quite facile. Further it need not be limited to the side by side arrangement shown in FIG. 8A: it may be in a two over two arrangement as shown in FIG. 8B to provide 512 positions with up to 16 bits across. Although in FIG. 8A the sets of S-box values 132, 134, 136, 138 are stored in the same locations "63" across each memory array, LUT's 50 a-d, this is not a necessary limitation of the invention. By adding a table base register 51 a-d with each array, LUT's 50 a-d they may be stored at any different, available locations in each array. For example, S-box 2, 3 and 4, a 64 entries LUT 134, 136, 138 could be stored starting at location "0" or S-box 2 could be stored starting at location "0" while S-box 3 and 4, 136, 138 could be stored starting at location "191". In this way related sets of data, e.g. S-box 1-4, 1/GF(x1-4) need not be stored at the same location across all memory arrays 50 a-d but can be stored at independent addresses in each array.

The fact that a local reconfigurable fill and spill random access memory array with as few as 256 8 bit values can make a huge impact on the avoidance of pipeline stall is illustrated with respect to a variable length decoding (VLD) application as explained with reference to FIGS. 9-12. In such an application the variable length code takes advantage of the fact that certain code values are going to occur more often then others. If frequently occurring values are assigned short length code words and infrequently ones transmitted using longer code words an effective bite rate reduction will be obtained. As an analogy, if English text was being transmitted "a", "e", "i" would be sent with short code words whereas "z" would be sent using a long code word. For example, a, b, c, d, e, f . . . are coded with variable length keys as shown by the graphic depiction in FIG. 9. The symbol a is represented by 0, the symbol b by 0 1, the symbol c by 1 0 0, the symbol d by 1 0 1, the symbol e by 1 1 0, the symbol f by 1 1 1 0, symbol g by 1 1 1 1 0 and so on. Thus upon receipt of a VLD input bit stream, FIG. 10, by bit-FIFO register 140, an inspection of n bits where n equals to 8 is made as at 150, FIG. 11. The inspected 8-bit field is used as an address into the compute unit 256 entries VLD LUT. The LUT entry can be marked as an identified symbol 152 (MSB is set to "1") or it can mark that more bits are needed to identified the symbol 166 (MSB is set to "0"). In the case where a symbol is identified the LUT entry holds the value 156 of the decoded symbol as well is how many bits 154 to remove (extract) from the bit stream to start the inspection of the next symbol. In the case 166 where more bits are needed the LUT entry holds an indication of how many additional bit stream bits are needed to complete the identification 168 as well as a pointer 176 to another L1-LUT that is responsible for the identification of all the symbols that are longer than 8 bits. This process is terminated when an LUT entry is marked as symbol identified 170. Note that in the first two examples in FIG. 11, the local reconfigurable fill and spill random access memory array satisfied all the requirements internally, no external memory was needed and so pipeline stall was avoided. However, in the third example the local reconfigurable fill and spill random access memory array could not satisfy the need and an external memory had to be consulted causing pipeline stall.

Figures 12, 13:
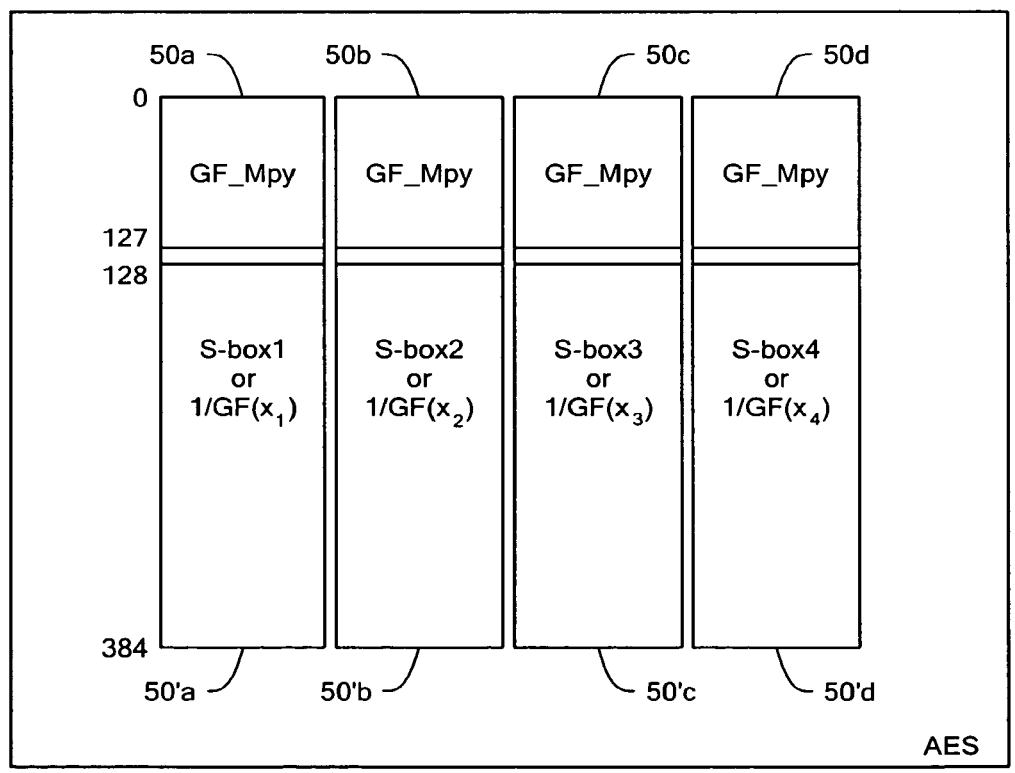
FIG. 12 is a table showing that in MPEG-2 over 97% of the operations for the VLD can be accomplished within the compute unit using its own 256 8 bit values in a local reconfigurable fill and spill random access memory array according to this invention minimizing pipeline stall.
FIG. 13 is a diagram of four local reconfigurable fill and spill random access memory arrays of only 384 8 bit values which can be used for Galois field multiplication for Advanced Encryption Standard (AES) encryption or Reed-Solomon Forward Error Correction (FEC)

However, in cases of interest the invention is very successful. For example, in an MPEG-2 VLD decoding process where the maximum codeword size is 16 bits as shown in FIG. 12, the variable length codeword identification process can be broken into three inspection groups (8, 5, 3) of which the first is the group of all the most probable code words (symbols that are going to occur often) with eight bits or fewer. The second is the group of all the code words with fewer than twelve bits and greater than eight and the last one is of all other infrequent code words with more than twelve bits. The local reconfigurable fill and spill random access memory array will identify the first group of the 25 most probable code words with the probability of 97.2% to occur in one Compute-Unit-LUT reference. An additional 5-bit-L1-LUT reference will identify the second group of 40 code words with the probability of 1.3+% to occur, and a third 3-bit-L1-LUT reference will identify the third group of 48 infrequent code words with the probability to occur of 0.17+%. Similar results appear for the 8 4 4 inspection series. Thus, whichever way it is done 8 5 3 or 8 4 4, over 97% of the time the local reconfigurable fill and spill random access memory array can identify the codeword in one LUT reference. Further, the average memory access required to identify any of the MPEG-2 VLD code words is (1*0.97+2*0.013+3*0.0013)=1.005127 for the 8 5 3 inspection series and 1.00708 for the 8 4 4 inspection series. This means that employing this invention using memories as small as 256 8 bit structures, the average lookup time for internal and external memory fetches combined is barely more than 1 cycle time. The invention thus bestows a distinct advantage in pipelined digital signal processors. While a 256 8 bit structure or less is sufficient to bestow the advantages of this invention, in some cases, just a bit more will accommodate even more situations. For example, FIG. 13, for Galois field multiply operation in an AES encryption, a 128 8 bit structure 50 *a-d* is required for the Galois field multiplier values and another 256 50 *a-d* is required for the S-box values for a total of only 384 8 bit structures per local reconfigurable fill and spill random access memory array. For Reed-Solomon implementation 50' *a-d* will contain the 1/GF(x) values.

Figure 14:
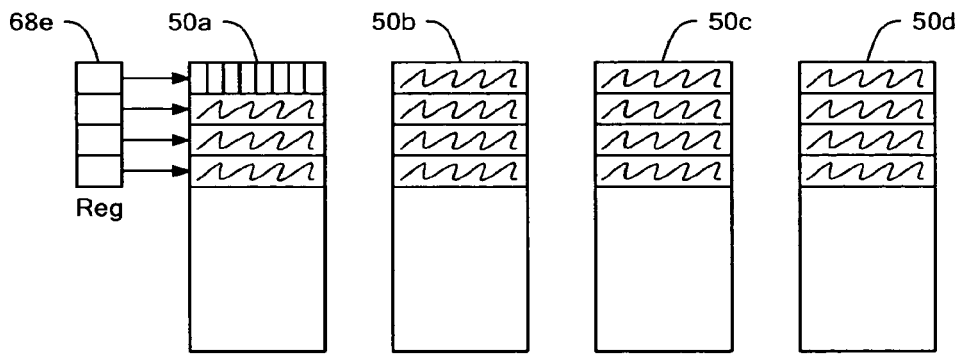
FIG. 14-17 are diagrammatic illustrations of parallel and serial fill and spill operations in a local reconfigurable fill and spill random access memory array according to this invention.
Figure 15:
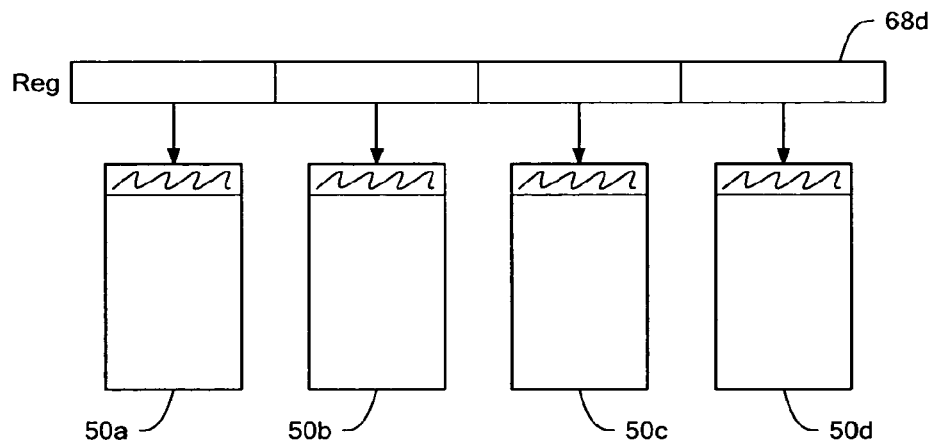
Figure 16:
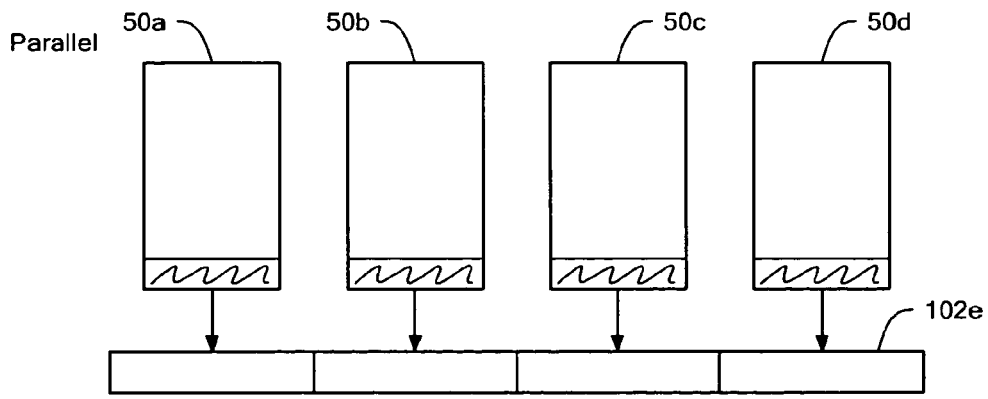
Figure 17:
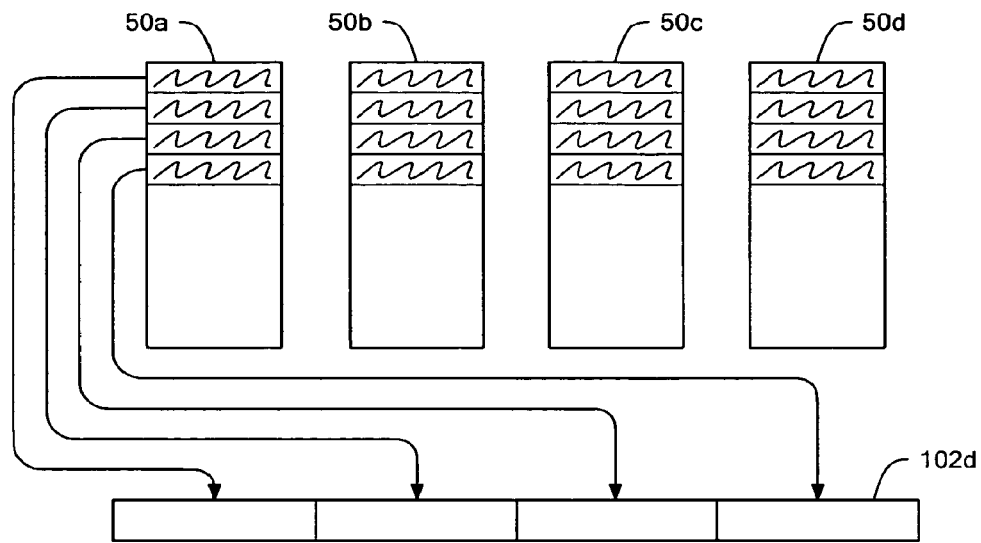

The one or more local reconfigurable fill and spill random access memory arrays may be filled in parallel by broadcasting the value from input registers 68*e*, FIG. 14, simultaneously to all of the local reconfigurable fill and spill random access memory arrays, 50*a, b, c, d* . . . or it may be done in serial from input register 68*d*, FIG. 15, separately to each of local reconfigurable fill and spill random access memory arrays 50*a, b, c, d* . . . . So, too, the spills of local reconfigurable fill and spill random access memory arrays 50, a, b, c, d . . . may be done in parallel from each of them to output register 102*e*, FIG. 16, or in serial one at a time from local reconfigurable fill and spill random access memory arrays 50 *a, b, c, d* . . . to output register 102*d*, FIG. 17.

Figure 18:
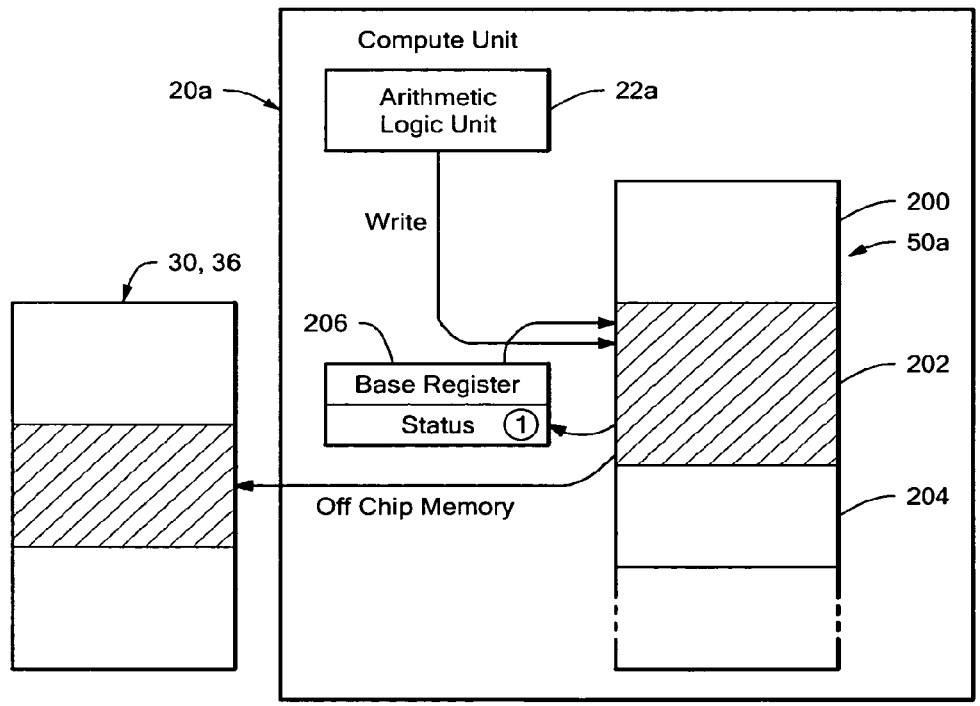
FIG. 18 is a diagrammatic illustration of conditional, selective spill in a local reconfigurable fill and spill random access memory array according to this invention.

The fill and spill operations need not be conducted on the entire local reconfigurable fill and spill random access memory array 50 *a, b, c, d*, but only on a portion of it as necessary to further conserve time and resources. That is, the spill operation can be conditional and selective. For example, in compute unit 20*a*, FIG. 18, each of the sections 200, 202, 204 . . . of the local reconfigurable fill and spill random access memory array may have different groups of functions. As the overall general algorithm, FIG. 4, is carried out, the sections of local reconfigurable fill and spill random access memory array 50*a*, FIG. 18, are overwritten with new information, a section at a time, selectively, as necessary. However, if one of those sections, for example, 202, has been updated by arithmetic logic unit 22*a*, a status circuit 206 detects that update and notes the base register position and causes that section 202 of values to be spilled to some external memory 30 or 36 where it will be stored until needed. If none of the values had been updated then it would have been just overwritten and the original set of values would have been recalled from memory 30 or 36 as usual in due course.

Figure 19:
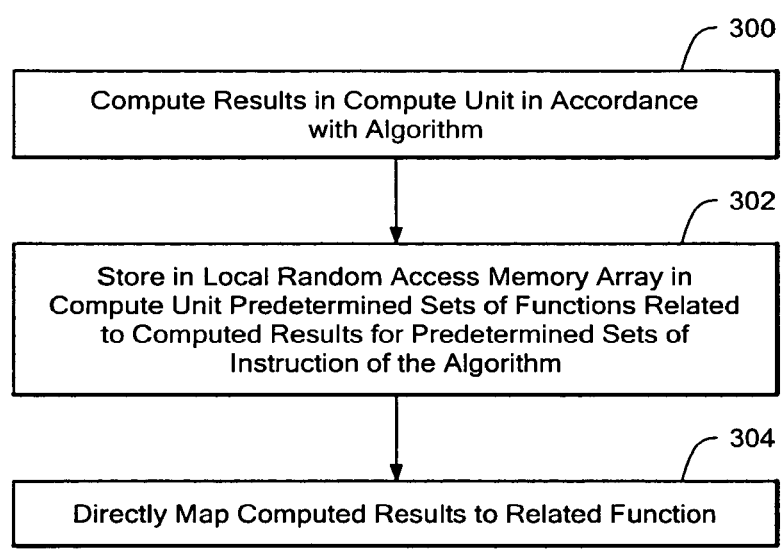
FIG. 19 is a simplified flow chart of the method of this invention.

A simplified depiction of the method according to this invention is shown in FIG. 19. It begins with the computation of results in compute units in a processor in accordance with an algorithm, 300. Then predetermined sets of functions related to computed results from predetermined sets of instructions of the algorithm are stored in local random access memory array in compute units, 302. The computed results are then directly mapped, 304, to a related function.

More specifically, the processor includes a register file shared by the compute units. All the compute unit local random access memory arrays are filled in parallel with values from the register file. The values may be like values or different values. The local random access memory arrays may be spilled in parallel to the register file as well. There is an indication made in a status device in a compute unit when one or more values stored in the section of the random access memory array have been updated. A decision is then made in the status device as to whether values in the random access memory array should be spilled and saved. The mapping of the computed result to related function is done independently from a previous computed result mapping or from one compute unit to another. A register from the register file is used as an index to the random access memory arrays and multiple compute units. The output of the random access memory arrays and multiple compute units may be combined into a single register of the register file. A different register from the register file may be used as an index for the random access memory array in each compute unit. The output of each random access memory array in each compute unit may be placed in different registers in the register file. The local random access memory arrays may include lookup tables. There may be stored in the local random access memory array predetermined sets of instructions of the algorithm to provide direct mapping of the computed results to related function within the compute unit. Related sets of data may then be stored at independent addresses in each local reconfigurable fill and spill random access memory array using a table register associated with each local random access memory array in the compute unit.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A system for reducing pipeline stalls caused by data-dependent instructions, the system comprising:
 a compute unit for computing values in response to instructions, the compute unit comprising a plurality of processing elements disposed in pipeline stages, wherein one processing element is a look-up table comprising predetermined function values mapped to the computed values, the function values being determined by applying a function to the computed values;

a register file disposed outside the compute unit and connected thereto via a system bus, the register file comprising a computed value computed by the compute unit in response to a first instruction;

circuitry for applying the computed value to the look-up table, receiving the predetermined function value mapped to the computed value from the look-up table, and writing the predetermined function value to the register file, wherein the predetermined function value is used in a second instruction.

2. The system of claim 1, wherein the look-up table comprises a reconfigurable fill-and-spill memory.

3. The system of claim 2, wherein the fill-and-spill memory is accessible in one cycle.

4. The system of claim 1, wherein mapping the computed value to the predetermined function value in the look-up table prevents an external fetch and pipeline stall.

5. The system of claim 1, wherein the processing elements further comprise a multiplier, a select circuit, a polynomial multiplier, a barrel shifter, an arithmetic logic unit, an accumulator, or a multiplexer.

6. The system of claim 1, wherein the processor comprises a plurality of compute units.

7. The system of claim 6, wherein the plurality of compute units share the register file.

8. The system of claim 7, wherein the register file fills the look-up tables in series or in parallel.

9. The system of claim 1, further comprising an input register for loading a function value into the look-up table.

10. The system of claim 1, further comprising an output register for storing the mapped value.

11. A method for reducing pipeline stalls caused by data-dependent instructions, the method comprising:

determining a function value by applying a function to an output value;

storing the function value in a look-up table disposed in a pipeline stage in a compute unit in a processor, the function value being mapped to the output value;

computing, in the compute unit, the output value in accordance with a first instruction, the first instruction having a data dependency with a second, subsequent instruction;

applying the output value to the look-up table in the compute unit to obtain the stored function value; and executing the second instruction in the compute unit, using the stored function value, without causing an external fetch or a pipeline stall.

12. The method of claim 11, wherein storing the function value comprises filling the value from a register file.

13. The method of claim 11, further comprising storing a plurality of function values in a plurality of look-up tables disposed in a plurality of compute units.

14. The method of claim 13, wherein the function values are stored in series or in parallel.

15. The method of claim 11, wherein the function value is stored in a register file connected to each of a plurality of compute units via a system bus.

16. The method of claim 11, wherein the second instruction is immediately subsequent to the first instruction.

* * * * *